UNITED STATES PATENT OFFICE.

LEWIS S. CHICHESTER, OF BROOKLYN, NEW YORK, ASSIGNOR TO CHARLES F. CHICHESTER, OF SAME PLACE.

IMPROVEMENT IN PREPARING CORN-MEAL FOR SHIPMENT.

Specification forming part of Letters Patent No. 136,306, dated February 25, 1873.

*To all whom it may concern:*

Be it known that I, LEWIS S. CHICHESTER, of Brooklyn, Kings county, State of New York, have invented an Improvement in Preparing Corn-Meal for Shipment, of which the following is a specification:

Great difficulty is experienced in the shipment of corn-meal either to distant markets or for use on shipboard, because the meal absorbs moisture with rapidity, and when exposed to atmospheric influence the quality rapidly deteriorates and the meal loses its agreeable smell and taste.

My improvement is a new article of manufacture, consisting of maize scoured, dried, ground, and packed into tin cans or other similar packages, by a pressure that is sufficient to compress the mass to about one-half the ordinary bulk, and thereby expel the atmosphere sufficiently to prevent any injurious effect therefrom and exclude the damp sea air, thereby insuring sweet and wholesome meal after shipment to any climate and during a long period of time.

I scour the maize in any suitable mill, so as to remove any surface impurities or foreign matter. An apparatus adapted to this is shown in my patent No. 121,847.

The corn is then thoroughly dried or desiccated by currents of heated air. An apparatus adapted to this purpose is shown in Letters Patent No. 121,588, granted to C. F. Chichester.

The maize is then ground to the desired grade in any suitable mill, and packed in tin canisters or other convenient cases by hydraulic or other pressure, that is sufficient to compress the meal into one-half the ordinary space, and thereby expel the atmosphere and prevent injury in transportation, because the air can act only on portions of the outside of the mass, and cannot penetrate and injure the same in any reasonable length of time.

The meal prepared in this manner is especially adapted to shipment, because it occupies much less space than the ordinary meal, and, as before stated, does not become injured by the sea air.

I claim as my invention—

The desiccated and ground maize, reduced in bulk by pressure sufficient to expel most of the atmosphere, and inclosed in a tin or other package, as set forth, as a new article of manufacture.

Signed by me this 12th day of August, A. D. 1872.

LEWIS S. CHICHESTER.

Witnesses:
GEO. T. PINCKNEY,
CHAS. H. SMITH.